April 3, 1962   E. BURHOP   3,028,094
MIXING AND SHUTOFF VALVE
Filed Nov. 16, 1959   2 Sheets-Sheet 2
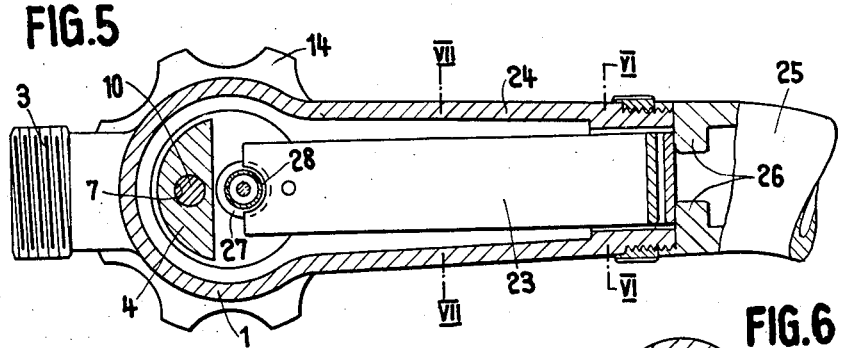
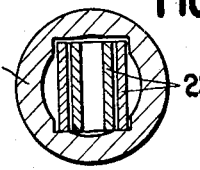
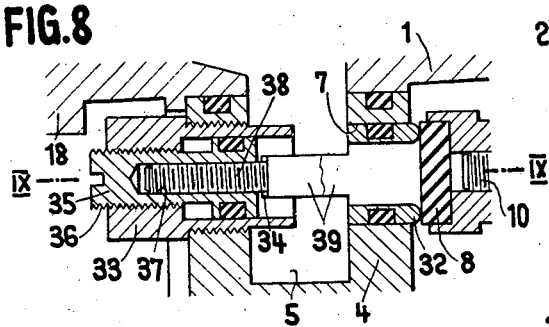
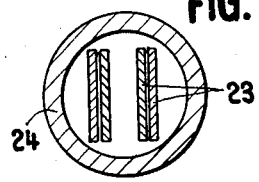
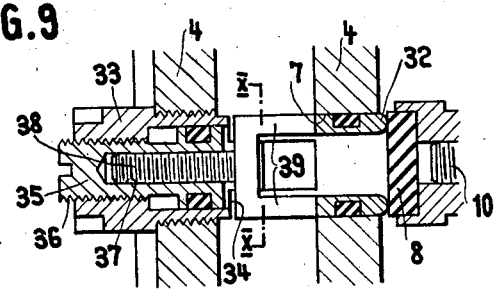
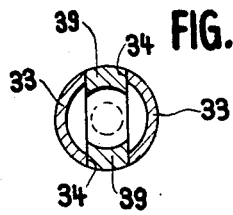
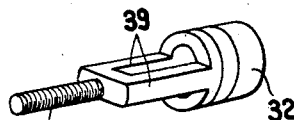
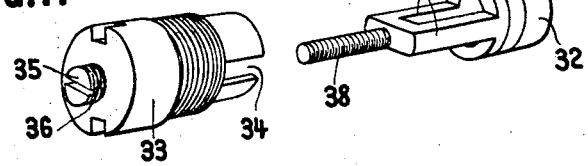
INVENTOR
Emil Burhop
BY
ATTORNEYS

United States Patent Office 3,028,094
Patented Apr. 3, 1962

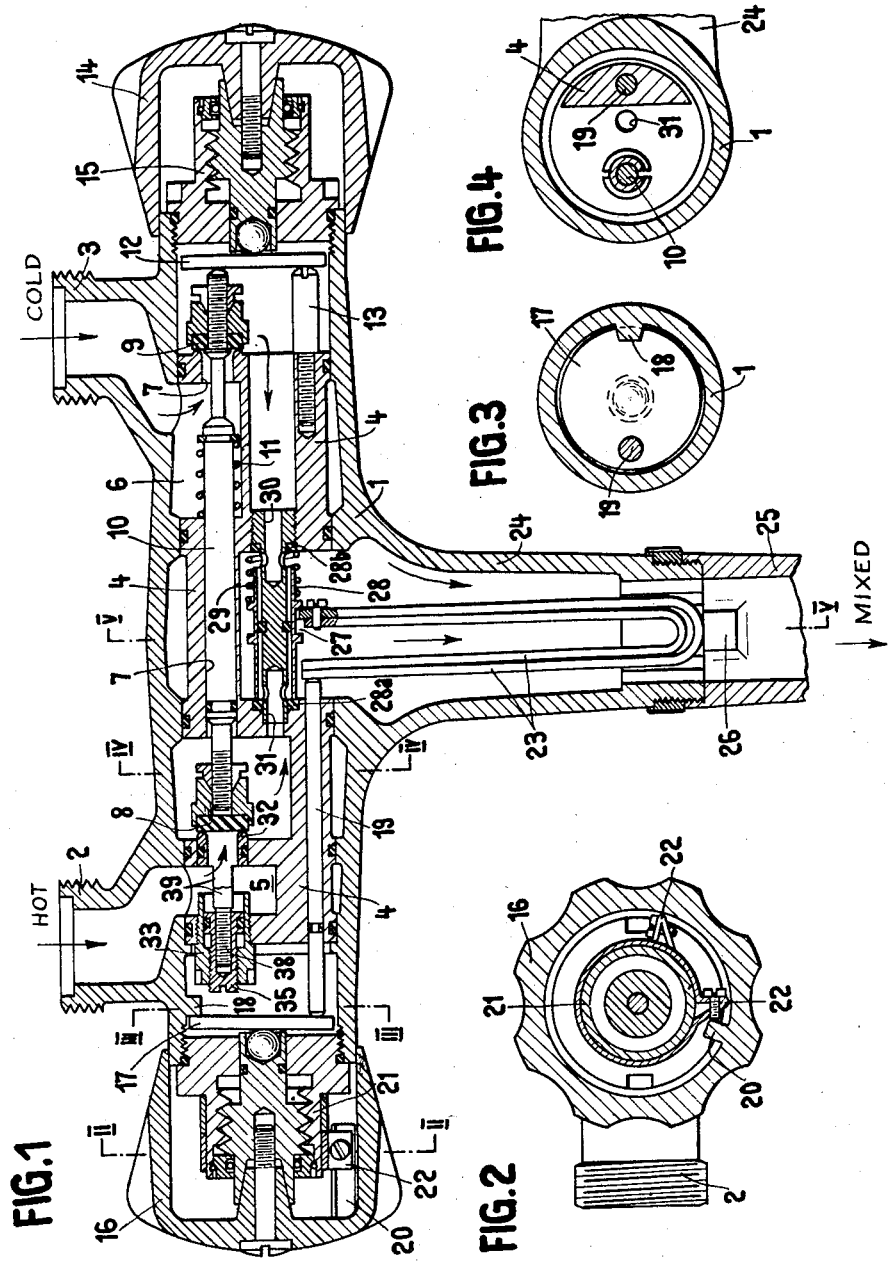

3,028,094
MIXING AND SHUTOFF VALVE
Emil Burhop, Bonstettenstrasse 12, Bern, Switzerland
Filed Nov. 16, 1959, Ser. No. 853,066
Claims priority, application Switzerland Nov. 25, 1958
10 Claims. (Cl. 236—12)

The present invention relates to a mixing and shutoff valve and more particularly to a valve having separate shutoff means for the hot water and cold water supply, a regulating means controlled in dependance on the mixed water temperature for automatically adjusting the hot and cold water flow and adjusting means for said regulating means. Valves of this kind serve for mixing hot and cold water, the mixed water temperature being automatically adjusted to a determined value.

Hitherto, the arrangement of separate shutoff means at the inlet of hot and cold water required a complicated and space-consuming design. For the sake of simplification, the anyhow required control valves for regulating the hot and cold water flow have also been used as shutoff valves in that they were pressed against their seats. However, since such shutoff valves have at least one soft part exposed to gradual deformation, the wear and tear of the valve seal resulted in an undesired shift of the regulation point.

One of the objects of this invention is to provide a mixing and shutoff valve of simple and space-consuming size.

Another object of the invention is to provide a mixing and shutoff valve in which the shutoff means, the regulating means and the adjusting means are arranged in holes of a single, generally cylindrical valve body.

Another object of the invention is to provide a mixing and shutoff valve in which the space available in the valve body is utilized to a high degree which results in a relatively small diameter of the valve.

Another object of the invention is to provide a mixing and shutoff valve in which all adjustable parts move in a direction parallel to the longitudinal axis of the valve body in order to obtain very simple operating means for all movement transmissions.

Another object of the invention is to provide a mixing and shutoff valve with one or more bimetallic lamellae lying in the outlet connection of the valve.

Another object of the invention is to provide a mixing and shutoff valve in which undesired automatic adjusting movements of the operating knobs or the like are prevented.

Another object of the invention is to provide a mixing and shutoff valve in which synchronous opening and closing of the valve seats for hot and cold water can be adjusted during the working of the valve.

Other objects, features and advantages of the invention will be apparent as the following description proceeds, reference being had to the accompanying drawings illustrating by way of example an embodiment of the invention, wherein:

FIG. 1 is a sectional view of the mixing and shutoff valve,
FIG. 2 is a section along line II—II of FIG. 1,
FIG. 3 is a section along line III—III of FIG. 1,
FIG. 4 is a section along line IV—IV of FIG. 1,
FIG. 5 is a section along line V—V of FIG. 1,
FIG. 6 is a section along line VI—VI of FIG. 5,
FIG. 7 is a section along line VII—VII of FIG. 5,
FIG. 8 illustrates a detail of FIG. 1 on a larger scale,
FIG. 9 is a section along line IX—IX of FIG. 8,
FIG. 10 is a section along line X—X of FIG. 9,
FIG. 11 is a perspective view of a valve portion and
FIG. 12 is a perspective view of another valve portion.

Referring now to the drawings and more particularly to FIG. 1, the mixing and shutoff valve has a casing 1 with an inlet connection 2 for hot water and an inlet connection 3 for cold water. A generally cylindrical valve body 4 is received in a through hole of the valve casing 1 and has recesses 5 and 6 communicating with the connections 2 and 3 respectively. The valve body 4 has a through hole 7 forming valve ports in the walls limiting the recesses 5 and 6 at their right side (FIG. 1). The valve seats lying in front of these ports can be closed by seals 8 and 9 fixed to a valve rod 10 slidably mounted in the hole 7. A spring 11 permanently acts onto the valve rod 10 with an opening tendency and holds the right end (FIG. 1) of the rod 10 in contact with a disc 12 loosely inserted in the hole of the valve casing 1. In a point about diametrically opposite to the end of the rod 10 the disc 12 bears against a pin 13, while the middle of the disc 12 contacts a ball of an operating knob 14. The knob 14 is screwed into a threaded sleeve 15 tightly connected with the valve casing 1. The knob 14, on being rotated, is given an axial displacement which is transmitted through the above-mentioned ball to the disc 12, thereby causing tilting of the disc 12 about the point of support on the pin 13.

At the opposite end of the valve casing 1 there is provided an operating knob 16 similar to knob 14. Knob 16 acts onto a disc 17 corresponding in shape and arrangement to disc 12, the position of disc 17 being determined by its support on an extension 18 of the valve casing 1, by the operating ball of the knob 16 and by the one end of a rod 19. The operating knob 16 is distinguished from the operating knob 14 in that for determining its end positions it comprises a top 20 on its inner surface, cooperating with two individually adjustable end stops 22 fixed to or integral with the threaded sleeve 21. The other end of the rod 19 bears against two U-shaped bimetallic lamellae 23 screwed together and freely inserted in the outlet connection 24 and secured against longitudinal displacement by their being supported on cams 26 of the delivery pipe 25. The screwed end of the bimetallic lamellae engages a groove 27 of an adjusting sleeve 28 displaceable between two seats 28a and 28b. A spring 29 permanently tends to shift the adjusting sleeve 28 towards the left in FIG. 1. The sleeve 28 is mounted on a cylinder having admission holes 30 and 31.

On the end wall of the valve body 4, limiting the recess 5 towards the left (FIG. 1), there is mounted an adjusting device for fine adjustment of the seat 32 of the hot water-shutoff valve (FIGS. 8 to 12). The said device comprises a sleeve 33 screwed fast to the said end wall, the end of this sleeve, entering the recess 5, having slots 34 lying diametrically opposite to each other (FIG. 11). An adjusting screw 35 having an external thread 36 and an internal thread 37 is screwed into the sleeve 33, the internal thread 37 engaging an adjusting bolt 38 of the valve seat 32. The valve seat 32 is in the shape of a hollow cylinder with its rear portion milled to form two legs 39 lying diametrically opposite to each other and rigidly connecting the annular seat 32 with the adjusting bolt 38 (FIG. 12). In the assembled condition shown in FIGS. 1, 8 and 9 the legs 39 engage the slots 34 of the sleeve 33 so that the piece 32, 39, 38 is guided in the sleeve 33 in a manner to prevent its rotation and to allow its axial adjustment. The pitches of the external and internal threads 36 and 37 respectively of the adjusting screw 35 are slightly different from each other and amount, for instance, to 0.7 and 0.75 mm. respectively. Therefore, as is well known to experts, on rotating the adjusting screw 35 in the sleeve 33, the adjusting bolt 38, on each revolution of the adjusting screw, is only displaced by the difference of the pitches, i.e., in the case of the above numerical example, only by 0.05 mm. Therefore, a very fine adjustment of the axial position of the seat 32 is rendered possible.

In the drawings, the mixing valve is shown in its closed condition, i.e., the operating knob 14 is completely screwed towards the inside so that the valve rod 10 is entirely shifted towards the left by means of the disc 12 against the constraint of the spring 11. In consequence, the seals 8 and 9 are pressed onto their seats and the water coming from the inlet connections is retained by these closed inlet valves. If water is to be delivered from the mixing valve, at first the operating knob 16 provided with a temperature scale (not shown) is adjusted to the position corresponding to the desired temperature of the mixed water to be delivered. The axial adjusting movement of the operating knob 16 is transmitted to the disc 17 and from here at an increased amount to the rod 19 which slightly swings the bimetallic lamellae 23, the spring 29 permanently guaranteeing contact between the lamellae 23 and the rod 19 and a contact, free from play, of the disc 17 with its three points of support. It may now be assumed that the sleeve 28 has already been displaced out of the position shown in FIG. 1 so that it is lifted off the seats 28a and 28b. When the valve is now opened by turning the operating knob 14, the seals 8 and 9 are simultaneously removed from their seats and hot and cold water from the recesses or chambers 5 and 6 can enter the holes 30 and 31 through the inlet valves and flow out at both ends of the adjusting sleeve 28. The water being mixed at this occasion flows through the outlet connection 24 to the delivery pipe 25, while the bimetallic lamellae 23, due to the temperature increase, are bent towards the hole 31 so that the hot water supply is throttled and the cold water supply is intensified. In this way, a balanced condition is reached in a very short time, in which the adjusting sleeve 28 comes to rest and holds the temperature of the mixed water constant. If the temperature in one of the water streams flowing to the mixing valve changes, the control system comprising the bimetallic lamellae 23 and the adjusting sleeve 28 instantaneously intervenes in such a manner that the temperature of the mixed water alters as little as possible. Closing the valves and changing the mixing temperature will be well understood by those skilled in the art and, therefore, need no further explanations.

Each of the discs 12 and 17 allows obtaining a leverage doubling the axial movement of the operating knobs 14 and 16. This is of great advantage since it allows keeping the pitch of the threads in the knobs 14 and 16 very small and therefore, preventing undesired automatic adjusting movements of these knobs. As an additional safeguard against such undesired adjusting movements brakes comprising an intermediate ring and two spring rings are provided. Moreover, the discs 12 and 17 represent a very simple and reliable means to transmit the movements of the operating knobs 14 and 16 out of the valve axis towards the outside. This lateral shift of the movements to directions parallel to the valve axis offers also the great advantage of utilizing to a high degree the space available in the valve body 4 in that the hole 7 receiving the valve rod 10, the hole for the rod 19 and the hole for the supply of water to the adjusting sleeve 28 can be distributed on the cross section of the valve body 4 in a very space-economizing manner. FIGS. 3 and 4 illustrate the distribution of the holes in a common, horizontal diametrical plane. In another performance of the valve according to the invention a still better utilization of the space, i.e., a still further reduction of the valve diameter may be obtained, if the holes are distributed over the cross section of the valve body in any other way. The very slender shape of the valve body 4, in spite of the illustrated disposition of the inlet valves, is also rendered possible for the further reason that the bimetallic lamellae 23 project from the outside into the valve body 4. In spite of this arrangement of the bimetallic lamellae outside the valve body no additional casing portion is necessary in that the lamellae lie in the anyhow required outlet connection of the valve.

Due to the fact that all movable parts move in a direction parallel to the longitudinal axis of the valve body only very simple transmission members are required for all movement transmissions and the two operating knobs may be arranged at the opposite ends of the valve casing, which results in a practical and pleasing shape of the valve. It is of importance that the seals 8 and 9 close and open both accurately at the same moment. In order to obtain such synchronous opening and closing, the seat 32 can be finely adjusted in the above-described way. Such adjustment may be executed during operation and without complete disassembling of the valve. It is sufficient to unscrew the operating knob 16 with its threaded sleeve 21 and to remove the disc 17, whereupon the adjusting screw 35 will be accessible and can be turned by means of a screwdriver until the desired adjustment of the seat 32 is completed. During said adjusting operation the valve may be under working pressure in that no water can escape through the adjusting device for the seat 32.

While the invention has been described and illustrated with reference to a specific embodiment thereof it will be understood that other embodiments may be resorted to without departing from the invention. For example, there may also be a performance of the invention having only one operating knob for doing both operating the shutoff valves and regulating the water temperature. For realizing such an embodiment one possibility would be to omit the operating knob 14 and its correlated parts and to support the disc 17 on an extension of the valve rod 10 projecting towards the left instead of supporting it on the stationary part 18 and to displace the adjusting device of FIGS. 8 to 12 to the right end of the valve body. Furthermore, the spring 11 would have to act onto the valve rod in the closing and not in the opening sense and the opening movement of the valve rod would have to be limited by a stop. Furthermore, the spring 29 would have to be stronger than the spring 11. The operation would then be such that, on the valves 8 and 9 being closed, the operating knob 16 would be displaced completely to the left in FIG. 1, so that the spring 11 may press the seals 8 and 9 against their seats. For delivering water the operating knob 16 would then have to be screwed in, i.e. displaced towards the right. The spring 29 being stronger than the spring 11, the disc 17 would then be tilted about the supporting point on the rod 19, which for the moment would be at rest, and the valve rod 10 being on the constraint of the weaker spring 11 would then be displaced towards the right and the seals 8 and 9 thereby lifted off. When the valve rod 10 strikes against its stationary stop, the disc 17 begins to tilt about the now stationary supporting point at the end of the valve rod 10 so that on further rotation of the operating knob 16 adjustment of the regulating means in the above-described manner would begin. The axial movement of the knob 16 required for both operations could preferably be obtained by one single revolution of the knob, the temperature scale extending only over a portion, e.g. over half the circumference. However, in a modification a complete revolution for opening the valve and another complete revolution for adjusting the regulating means might be provided. The return stroke of the rod 19 should preferably also be limited by a stationary stop in order that on closing the valve a distinct transition from the adjusting movement for the regulating means to the closing movement of the valve rod may be obtained.

For another example, the bimetallic lamellae could be replaced by a ribbed tube or any other well-known expanding body whose movement would then be transmitted to the regulating member 28 in any suitable manner.

For a further example, the sleeve 33 of the adjusting device for the hot-water valve seat 32, instead of being tightly screwed into the valve body 4 may only partially or loosely be screwed into the said valve body in such a manner that it is possible to rotate this sleeve at any time during operation of the valve. However, the external thread of sleeve 33 should be threaded into the valve body in a sealing condition in order that leakage of water through the screw joint between sleeve 33 and valve body 4 is practically avoided. Of course the axial length of the external thread of sleeve 33 has to be chosen in a manner allowing subsequent rotation of this sleeve in its screw fastening. In this modification of the invention it is possible at any time to turn sleeve 33 by means of a suitable key, whereby the whole adjusting device together with the valve seat 32 is rotated and axially displaced. Since this axial displacement only depends on the pitch of the external thread of sleeve 33, a coarse adjustment is obtained by rotation of sleeve 33. Therefore, this modification of the invention allows preliminary coarse adjustment by rotation of sleeve 33 together with the whole adjusting device and subsequent fine adjustment by rotation of adjusting screw 35 in the manner set out above with reference to the illustrated embodiment.

Therefore, the form of the invention illustrated in the drawings and set out above with reference thereto should be considered as illustrative and not as limiting the scope of the following claims.

I claim:
1. A mixing and shutoff valve of the type described and comprising shutoff means for a hot water supply and shutoff means for a cold water supply, first hand-operable actuating means for common operation of both shutoff means, regulating valve means completely separate from both shutoff means, second hand-operable actuating means for manually adjusting the said regulating valve means and regulating means responsive to the mixed water temperature for automatically adjusting the said valve means in dependence on the mixed water temperature, a valve body of generally cylindrical shape, first bore means substantially parallel to the axis of the valve body, both shutoff means being accommodated in the said first bore means, and second bore means substantially parallel to the axis of the valve body and of the said first bore means respectively, the said regulating valve means being accommodated in the said second bore means, both shutoff means and the said regulating means being adapted for individual and independent translatory displacement within the said first and second bore means, respectively.

2. A mixing and shutoff valve as claimed in claim 1, said regulating means comprising at least one bimetallic element disposed outside said valve body in an outlet tube of the valve.

3. A mixing and shutoff valve as claimed in claim 2, said bimetallic element extending substantially in a direction transversal to the longitudinal axis of said valve body and longitudinally through the said outlet tube, a displaceable end of the said bimetallic element extending into said valve body and into engagement with the said regulating valve means.

4. A mixing and shutoff valve as claimed in claim 3, comprising a substantially U-shaped bimetallic element disposed with its legs substantially longitudinally in the outlet tube of the mixing valve and with the ends of its legs extending into the said valve body, one leg end operatively engaging the said regulating valve means and the other leg end operatively engaging the said hand-operable actuating means for adjusting the regulating valve means, the displacement of the regulating valve means being determined by super-position of the displacement of the said hand-operable actuating means acting onto the bimetallic element and the deformation of the bimetallic element due to changes of the mixed water temperature.

5. A mixing and shutoff valve as claimed in claim 1, a valve rod of both shutoff means and an adjusting rod for adjusting said regulating valve means being arranged eccentrically in said valve body relatively to the axis of the valve body, the axial movement of operating knobs centrally disposed relatively to the said axis of the valve body being transmitted in radial direction and in a stepped up manner by means of tiltable discs to said valve rod and said adjusting rod, respectively.

6. A mixing and shutoff valve as claimed in claim 5, said valve rod being eccentrically arranged relatively to the axis of the valve body at the side of the inlet connections for hot and cold water and said adjusting rod being eccentrically arranged relatively to the axis of the valve body at the side of the outlet connection.

7. A mixing and shutoff valve as claimed in claim 1, comprising two separate shutoff valves for hot and cold water supply, the said shutoff valves having each a valve member adapted for common control and displacement, the seat of one of the said shutoff valves being finely adjustable in axial direction.

8. A mixing and shutoff valve as claimed in claim 7, an adjusting device for the adjustable valve seat, tightly screwed in an end wall of said valve body and passing through said end wall, adjusting of the valve seat being possible from the outside while the valve is under working water pressure.

9. A mixing and shutoff valve as claimed in claim 8, comprising a regulating screw with external thread screwed into a stationary threaded sleeve and with internal thread screwed onto an adjusting bolt connected with said seat, the said external and internal thread having different pitch, the valve seat being thereby adjustable by the difference in the movements of two threads of different pitch upon rotation of the said regulating screw.

10. A mixing and shutoff valve as claimed in claim 9, the said sleeve being threaded in sealing condition into an internal thread of the valve body, a coarse axial adjustment of the said valve seat being possible by rotation of the said sleeve together with the said regulating screw.

References Cited in the file of this patent
UNITED STATES PATENTS

| | | |
|---|---|---|
| 2,267,976 | Hermann | Dec. 30, 1941 |
| 2,601,063 | Ovary | June 17, 1952 |
| 2,668,555 | Bartolat | Feb. 9, 1954 |